United States Patent
Stayton

(10) Patent No.: US 10,522,906 B2
(45) Date of Patent: Dec. 31, 2019

(54) SCANNING META-MATERIAL ANTENNA AND METHOD OF SCANNING WITH A META-MATERIAL ANTENNA

(71) Applicant: Gregory T. Stayton, Peoria, AZ (US)

(72) Inventor: Gregory T. Stayton, Peoria, AZ (US)

(73) Assignee: AVIATION COMMUNICATION & SURVEILLANCE SYSTEMS LLC, Phoenix, AZ (US)

(*) Notice: Subject to any disclaimer, the term of this patent is extended or adjusted under 35 U.S.C. 154(b) by 324 days.

(21) Appl. No.: 14/184,411

(22) Filed: Feb. 19, 2014

(65) Prior Publication Data

US 2015/0236409 A1    Aug. 20, 2015

(51) Int. Cl.
| | | |
|---|---|---|
| H01Q 3/00 | (2006.01) |
| G01S 7/00 | (2006.01) |
| G01S 7/03 | (2006.01) |
| G01S 13/42 | (2006.01) |
| G01S 13/95 | (2006.01) |
| H01Q 1/28 | (2006.01) |
| H01Q 3/44 | (2006.01) |
| H01Q 15/00 | (2006.01) |

(52) U.S. Cl.
CPC .......... *H01Q 3/00* (2013.01); *G01S 7/006* (2013.01); *G01S 7/03* (2013.01); *G01S 13/426* (2013.01); *G01S 13/953* (2013.01); *H01Q 1/28* (2013.01); *H01Q 3/44* (2013.01); *H01Q 15/002* (2013.01); *H01Q 15/0086* (2013.01); *Y02A 90/18* (2018.01)

(58) Field of Classification Search
CPC .................................................. H01Q 15/0086
USPC .......................... 342/26 R, 26 B, 158, 354
See application file for complete search history.

(56) References Cited

U.S. PATENT DOCUMENTS

| | | |
|---|---|---|
| 6,972,727 B1 | 12/2005 | West et al. |
| 7,492,304 B1 * | 2/2009 | Woodell .................. G01S 7/285 342/26 B |
| 7,864,114 B2 | 1/2011 | Sanada |

(Continued)

FOREIGN PATENT DOCUMENTS

| | | |
|---|---|---|
| CN | 102230965 A | 11/2011 |
| JP | 2008035424 A | 2/2008 |

(Continued)

OTHER PUBLICATIONS

M. Labidi, J. Belhadj Tahar and F. Choubani, "New design of antenna array using left handed meta-material "LHM" based on circular Split Ring Resonator "Srr"," 2011 11th Mediterranean Microwave Symposium (MMS), Hammamet, 2011, pp. 52-56.*

(Continued)

*Primary Examiner* — Marcus E Windrich
(74) *Attorney, Agent, or Firm* — Dickinson Wright PLLC

(57) ABSTRACT

Various antennas and systems of antennas can benefit from meta-material construction. For example, avionics antennas including weather antennas may benefit from being constructed of meta-materials. A method can include, for example, electronically scanning, by an antenna of an aircraft, an environment of the aircraft. The electronically scanning can include transmitting or receiving an electrical frequency over the antenna. The antenna can include a negative index of refraction meta-material. The electronically scanning can also include applying an electric field to control a dielectric constant of the antenna.

22 Claims, 4 Drawing Sheets

(56) References Cited

U.S. PATENT DOCUMENTS

| | | | |
|---|---|---|---|
| 7,889,117 B1 | 2/2011 | Woodell et al. | |
| 7,911,386 B1 | 3/2011 | Itoh et al. | |
| 8,013,693 B2 | 9/2011 | Schenkel et al. | |
| 8,351,126 B2 | 1/2013 | Peng | |
| 8,547,286 B2 * | 10/2013 | Xu | H01Q 15/0086 |
| | | | 343/700 MS |
| 2010/0033389 A1 | 2/2010 | Yonak et al. | |
| 2010/0156573 A1 * | 6/2010 | Smith | H01P 3/081 |
| | | | 333/239 |
| 2010/0231464 A1 * | 9/2010 | Huang | H01Q 1/38 |
| | | | 343/702 |
| 2011/0187601 A1 * | 8/2011 | Ryou | H01Q 9/0407 |
| | | | 343/700 MS |
| 2011/0199273 A1 | 8/2011 | Kim et al. | |
| 2011/0267247 A1 | 11/2011 | Choi et al. | |
| 2012/0194399 A1 * | 8/2012 | Bily | H01Q 13/28 |
| | | | 343/772 |
| 2012/0212395 A1 * | 8/2012 | Sanada | H01Q 15/0086 |
| | | | 343/912 |
| 2012/0235848 A1 * | 9/2012 | Bruno | G01S 7/36 |
| | | | 342/16 |
| 2012/0235867 A1 | 9/2012 | Kim et al. | |
| 2012/0274525 A1 * | 11/2012 | Lam | H01Q 19/06 |
| | | | 343/754 |
| 2015/0031345 A1 * | 1/2015 | Hyde | H01Q 1/241 |
| | | | 455/418 |

FOREIGN PATENT DOCUMENTS

| | | | | |
|---|---|---|---|---|
| WO | 200173891 A1 | 10/2001 | | |
| WO | WO 2010050666 A1 * | 5/2010 | | H01Q 15/02 |
| WO | WO-2010050666 A1 * | 5/2010 | | H01Q 15/02 |

OTHER PUBLICATIONS

M. Labidi, J. Belhadj Tahar and F. Choubani, "New design of antenna array using left handed meta-material "LHM" based on circular Split Ring Resonator "SRR"," 2011 11th Mediterranean Microwave Symposium (MMS), Hammamet, 2011, pp. 52-56. (Year: 2011).*

International Search Report and Written Opinion of the International Searching Authority for related application PCT/US2015/016594 dated May 11, 2015.

Sergey P. Antipov, Wanming Liu, John Gorham Power, Linda K. Spentzouris, "Left-Handed Metamaterials Studies and their Application to Accelerator Physics", Proceedings of 2005 Particle Accelerator Conference, Knoxville, Tennessee p. 458-460, Editor IEEE Catalog No. 05CH37623C / 0-7803-8859-3/05/2005 IEEE.

* cited by examiner

SCANNING META-MATERIAL ANTENNA AND METHOD OF SCANNING WITH A META-MATERIAL ANTENNA

BACKGROUND

Field

Various antennas and systems of antennas can benefit from meta-material construction. For example, avionics antennas including weather antennas may benefit from being constructed of meta-materials.

Description of the Related Art

Conventional weather antennas on aircraft typically include moving mechanical components. For example, conventional avionics weather radars use a mechanical gimbal mounted flat plate antenna.

These conventional weather radars are heavy due to the mechanical mounting system. Moreover, conventional weather antennas are limited in antenna gain, due to the use of individual slotted antenna elements having a positive index of refraction.

E-Scan airborne radars conventionally include expensive flat plate antenna arrays of active components, each active component driving an individual antenna element. Due to the large number of active elements, these radar systems may be less reliable than passive slotted antenna element designs.

Additionally, such conventional radars are limited in antenna gain and have a limited amount of variation of lateral and vertical scan angle, due to limitations of the antenna element beam forming capability at large off-center angles. These limitations are, in turn, due to the limited positive index of refraction.

SUMMARY

According to certain embodiments of the present invention, a method can include electronically scanning, by an antenna of an aircraft, an environment of the aircraft. The electronically scanning can include transmitting or receiving an electrical frequency over the antenna, wherein the antenna comprises a negative index of refraction meta-material. The electronically scanning can also include applying an electric field to control a dielectric constant of the antenna.

In certain embodiments of the present invention, an apparatus can include avionics circuitry configured to scan an environment of an aircraft in which the avionics circuitry is installed. The apparatus can also include an antenna comprising a negative index of refraction meta-material. The avionics circuitry can be configured to apply an electric field to control a dielectric constant of the antenna. The avionics circuitry can be configured to scan the environment of the aircraft using the antenna.

A method, according to certain embodiments of the present invention, can include electronically communicating, by an antenna of an aircraft, with a remote device. The electronically communicating can include transmitting or receiving an electrical frequency over the antenna, wherein the antenna comprises a negative index of refraction meta-material. The electronically communicating can also include applying an electric field to control a dielectric constant of the antenna. The electrical frequency can include an avionics frequency.

BRIEF DESCRIPTION OF THE DRAWINGS

For proper understanding of the invention, reference should be made to the accompanying drawings, wherein.

DETAILED DESCRIPTION

Figure 1:
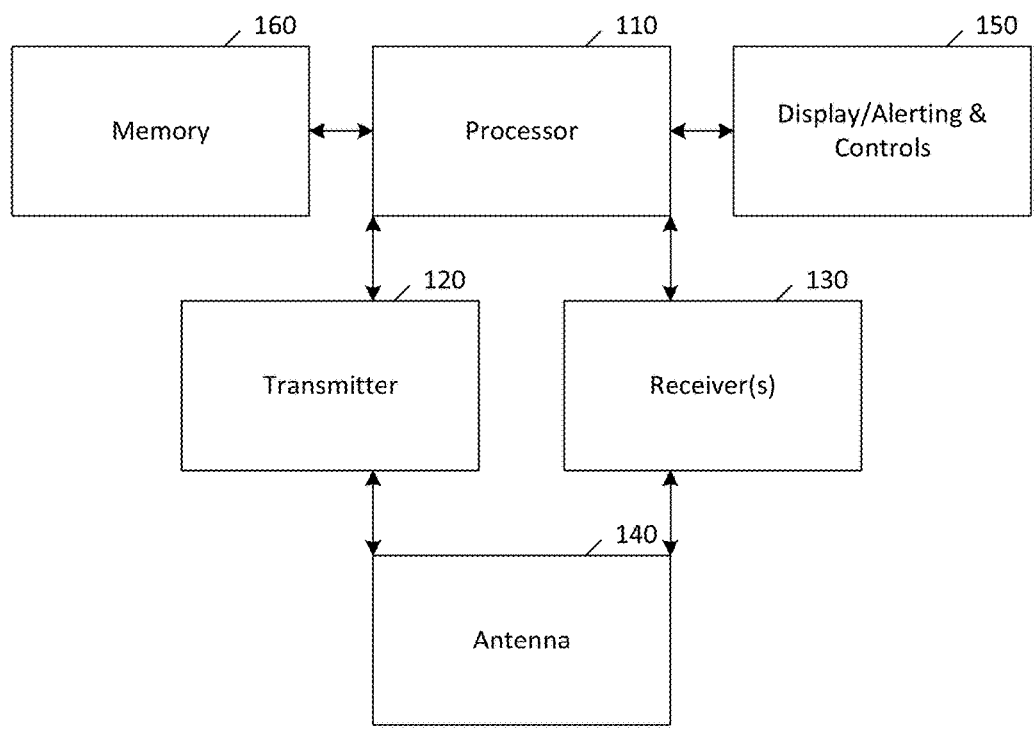
FIG. 1 illustrates a system according to certain embodiments of the present invention.

Certain embodiments of the present invention provide scanning antennas that include meta-material (MM) flat conformal antenna structures with a negative index of refraction. These flat conformal antenna structures with a negative index of refraction can bend an electromagnetic (E-M) radio frequency (RF) wave several times greater than the bending possible with positive index of refraction antennas.

The antenna structure according to certain embodiments of the present invention does not require arrays of active components in order to generate and steer the required RF beam width for the detection of weather. The MM RF beam can be steered using an electric field applied to a substrate. The applied electric field can change the dielectric constant of the MM antenna. Thus, the index of refraction can be modified to cause the antenna beam to point in a desired direction. Thus, a relatively low-cost E-Scan avionics weather radar with an antenna of the same size in existing airplanes today can be created. Moreover, this antenna can have a smaller beam spot size than conventional weather radars and consequently can provide higher weather resolution at greater distances than conventional weather radars.

Further, the MM E-Scan weather radar of certain embodiments of the present invention can laterally and vertically scan for weather at greater angles than conventional weather radars. Thus, such embodiments can provide the flight crew with a better field of view of the weather.

The MM E-Scan antenna can have other advantages, such as being able to instantaneously point in a desired direction, such as directly forward, to provide a continuous scan for turbulence and windshear while still providing a normal full field of view of the weather, even when the aircraft is turning. This instantaneous pointing feature can also provide a way to communicate with the ground or other aircraft with a time slotted type of communication link, such as a time division duplex (TDD), time division simplex (TDS), frequency division and/or multiplexed access, phase, amplitude modulation (AM), or other forms of communication modulated radio frequency (RF) communication link, at or near the weather radar frequency.

The MM antenna can also be electrically tuned such that multiple frequencies of operation within the normal C-Band or X-Band frequency bandwidth, for example between about 7.0 to 11.2 GHz or 8.0 to 2.0 GHz, can be used to provide a faster scan of the weather full field of view. Multiple frequency transmission can be performed by, for example, transmitting several pulses in one direction at different frequencies and receiving each of these pulses with several receivers each tuned to a particular frequency associated with a particular pulse.

Such an approach to multiple frequency transmission and reception can provide appropriate statistical weather range, intensity, and phase measurements at any given point within the scan angle of the antenna more rapidly. More rapid acquisition of such information can reduce the overall time needed for a full field of view scan of the weather, even when the aircraft is turning. Also, the update rate for a particular section of weather, such as a high intensity storm, turbulence, or windshear, can be updated more rapidly for better aircrew situational awareness.

FIG. 1 illustrates a system according to certain embodiments of the present invention. As shown in FIG. 1, a system can include a processor 110. The processor 110 can be configured to perform a variety of functions including, but not limited to, weather processing, turbulence processing, windshear processing, data link processing, and antenna pointing processing. The processor can be connected to one or more transmitter 120. The transmitter 120 can be frequency agile. For example, the transmitter 120 can be capable of transmitting on more than one frequency, such as a multiple of frequencies within a C-Band or X-Band.

The system can also include one or several receivers 130. The receivers 130 can be tuned to the multiple frequencies of the transmitter 120, so as to observe reflected signals that may indicate weather, windshear, turbulence, or the like. The receivers 130 can also be configured for data link communication and/or other avionics frequencies.

The system can also include one or more antenna 140. The antenna 140 can be a MM E-scan antenna, having a negative index of refraction. The negative index of refraction can be characterized by the following equation: $-n(\omega)^2=\varepsilon(\omega))*\mu(\omega)$, where $\varepsilon$ is the permittivity and $\mu$ is the permeability for a given frequency $\omega$.

The system can also include hardware for display/alerting and controls 150. This hardware can, for example, be embodied in a cockpit or can support other hardware that is provided in a cockpit. The hardware can work in coordination with the processor 110 to provide a display of weather conditions, alerts for weather hazards, alerts for windshear or turbulence, and the like. The hardware can also work to provide display, alerting, routing, inputs and outputs, or mode and frequency control for communication.

The system can further include memory 160, which can include read only memory (ROM) or random access memory (RAM). The memory 160 can hold configuration information for the system, and can also save the information to be displayed via display/alerting and controls 150. The memory 160 can be managed by the processor 110 and can, in certain embodiments, be located on a same chip with the processor 110, although this is not required.

Figure 2:
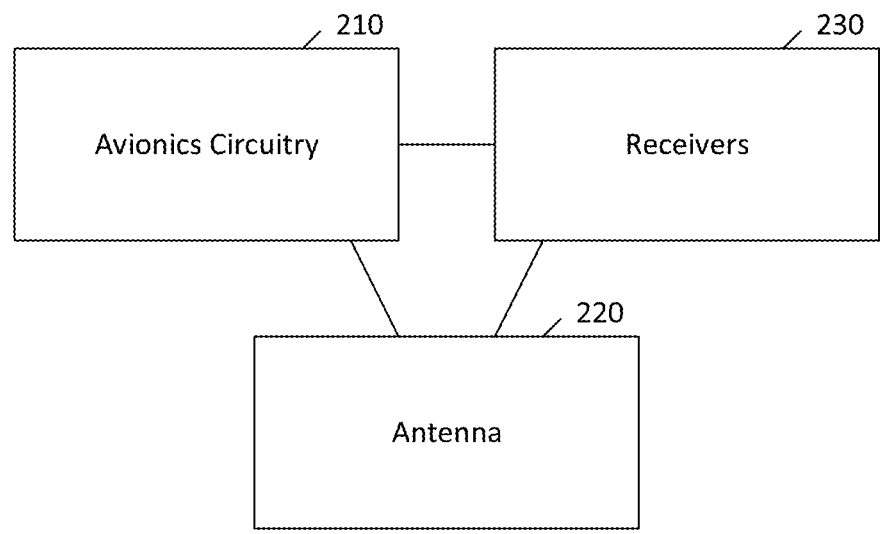
FIG. 2 illustrates another system according to certain embodiments of the present invention.

FIG. 2 illustrates another system according to certain embodiments of the present invention. As shown in FIG. 2, the system can include avionics circuitry 210, which can be configured to scan an environment of an aircraft in which the avionics circuitry 210 is installed. Additionally, the system can include an antenna 220, which includes a negative index of refraction meta-material. In certain embodiments, antenna 220 can correspond to antenna 140 in FIG. 1, and avionics circuitry 210 can correspond to the remaining elements of FIG. 1.

The avionics circuitry 210 can be configured to apply an electric field to control a dielectric constant of the antenna 220. Also, the avionics circuitry 210 can be configured to scan the environment of the aircraft using the antenna 220.

The antenna 220 can be a weather radar antenna. Other types of antennas can also be used in certain embodiments. The antenna 220 can be statically mounted to an exterior of an aircraft. Optionally, the antenna 220 can be dynamically mounted, such as on a mechanical gimbal arrangement.

The avionics circuitry 210 can be configured to electrically tune the antenna to a plurality of frequencies and sequentially or simultaneously transmit on the frequencies. The system can also include a plurality of receivers 230, each tuned to a respective one of the plurality of frequencies. The plurality of frequencies can be within a C-Band or X-Band frequency bandwidth.

The avionics circuitry 210 can be configured to scan the environment in various ways, including over both a variable vertical angle and a variable lateral angle, or over either of those variable angles. For example, a vertical angle window and a lateral angle window, or either of those windows, can be used.

The avionics circuitry 210 can include a plurality of meta-material antennas configured to create a summed signal in space. The plurality of meta-material antennas can also be combined with one or more conventional antenna.

Figure 3:
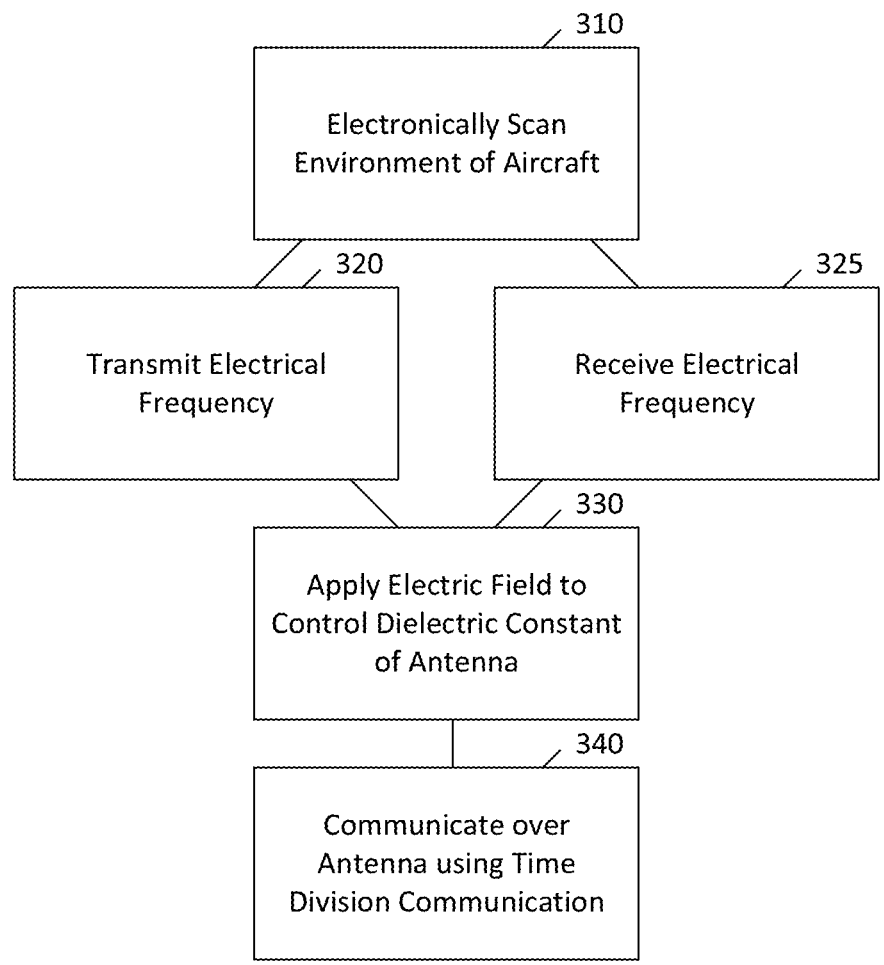
FIG. 3 illustrates a method according to certain embodiments of the present invention.

FIG. 3 illustrates a method according to certain embodiments of the present invention. As shown in FIG. 3, a method can include, at 310, electronically scanning, by an antenna of an aircraft, an environment of the aircraft.

The electronically scanning can include, at 320, transmitting an electrical frequency over the antenna, and/or, at 325, receiving an electrical frequency over the antenna. The antenna can include a negative index of refraction meta-material.

The electronically scanning can include operating a weather radar or another kind of radar. The scanning can further include electrically tuning the antenna to a plurality of frequencies and sequentially or simultaneously transmitting on the frequencies. The scanning can additionally include receiving the plurality of frequencies at a plurality of corresponding receivers. The plurality of frequencies can be within a C-Band or X-Band frequency bandwidth. The electronically scanning can include scanning in both a vertical angle arc and a lateral angle arc. Thus the vertical angle can be variable and/or the lateral angle can be variable. Thus, the vertical angle can be varied through, for example, a window of angles and likewise the lateral angle can be varied through, for example, another window of angles.

The method can also include, at 330, applying an electric field to control a dielectric constant of the antenna. The dielectric constant can, in turn, be used to control the shape of the antenna beam.

The method can further include, at 340, communicating over the antenna at the electrical frequency using time division communication. Other forms of communication are also possible. The time division communication can include, for example, time division duplex communication or time division simplex frequency division and/or multiplexed access, phase, AM, or other forms of communication modulated RF communication.

Figure 4:
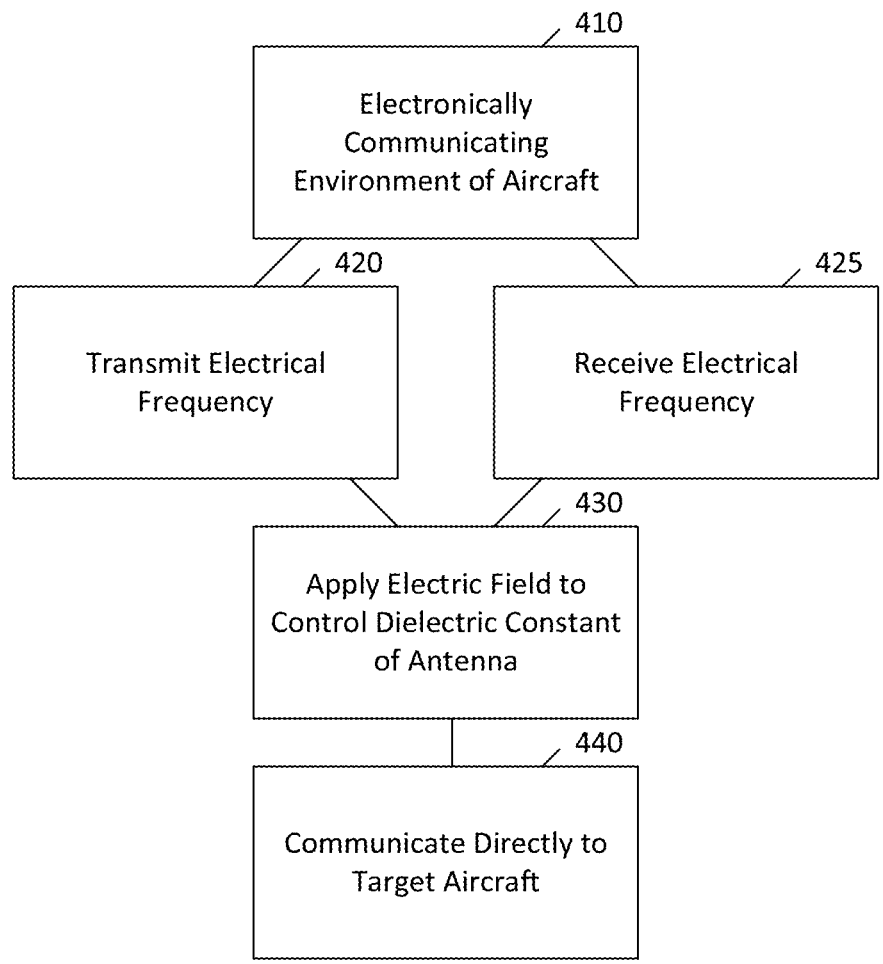
FIG. 4 illustrates another method according to certain embodiments of the present invention.

FIG. 4 illustrates another method according to certain embodiments of the present invention. As shown in FIG. 4, the method can include, at 410, electronically communicating, by an antenna of an aircraft, with a remote device. The electronically communicating can include, at 420, transmitting an electrical frequency over the antenna. The method can also or alternatively include, at 425, receiving an electrical frequency over the antenna. The antenna can include a negative index of refraction meta-material.

The method can also include, at 430, applying an electric field to control a dielectric constant of the antenna. The electrical frequency can be an avionics frequency. The method can further include, at 440, communicating data from the aircraft directly to a target aircraft over the antenna at the electrical frequency. The communicating can also be done directly to a satellite, boat, or ground station. Other targets of the communicating are also possible.

Other modifications and variations of the above methods and systems are possible. For example, while time division communication is mentioned, other forms of communication, such as code division, frequency, amplitude, or phase modulation, are also possible.

The methods shown in FIG. 3 and FIG. 4 may be performed, for example, by the systems shown in FIGS. 1 and 2. However, other systems can also be used for performing these methods.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims

I claim:

1. A method, comprising:
   electronically scanning, by an antenna of an aircraft using avionics circuitry, an environment of the aircraft,
   wherein the electronically scanning comprises:
   transmitting or receiving an electrical frequency over the antenna, wherein the antenna comprises a negative index of refraction meta-material, and
   applying, using the avionics circuitry, an electric field to a substrate of the antenna to control a dielectric constant of the negative index of refraction meta-material of the antenna.

2. The method of claim 1, wherein the electronically scanning comprises operating a weather radar.

3. The method of claim 1, wherein the scanning further comprises electrically tuning the antenna to a plurality of frequencies and sequentially or simultaneously transmitting on the frequencies.

4. The method of claim 3, wherein the scanning further comprises receiving the plurality of frequencies at a plurality of corresponding receivers.

5. The method of claim 4, wherein the plurality of frequencies are within a C-Band or X-Band frequency bandwidth.

6. The method of claim 1, wherein the electronically scanning comprises scanning over both a variable vertical angle and a variable lateral angle.

7. The method of claim 1, further comprising:
   communicating over the antenna at the electrical frequency using time division communication, time division duplex, time division simplex, frequency division and/or multiplexed access, phase, amplitude modulation, or modulated radio frequency (RF), frequency, amplitude, or phase modulation.

8. An apparatus, comprising:
   avionics circuitry configured to scan an environment of an aircraft in which the avionics circuitry is installed; and
   an antenna comprising a negative index of refraction meta-material,
   wherein the avionics circuitry is configured to apply an electric field to a substrate of the antenna to control a dielectric constant of the negative index of refraction meta-material of the antenna, and
   wherein the avionics circuitry is configured to scan the environment of the aircraft using the antenna.

9. The apparatus of claim 8, wherein the antenna comprises a weather radar antenna.

10. The apparatus of claim 8, wherein the antenna is statically mounted to an exterior of an aircraft.

11. The apparatus of claim 8, wherein the avionics circuitry is configured to electrically tune the antenna to a plurality of frequencies and sequentially or simultaneously transmit on the frequencies.

12. The apparatus of claim 11, further comprising:
    a plurality of receivers each tuned to a respective one of the plurality of frequencies.

13. The apparatus of claim 12, wherein the plurality of frequencies are within a C-Band or X-Band frequency bandwidth.

14. The apparatus of claim 8, wherein the avionics circuitry is configured to scan the environment over both a variable vertical angle and a variable lateral angle.

15. The apparatus of claim 8, wherein the apparatus comprises the aircraft.

16. A method, comprising:
    electronically communicating, by an antenna of an aircraft, with a remote device,
    wherein the electronically communicating comprises:
    transmitting or receiving an electrical frequency over the antenna, wherein the antenna comprises a negative index of refraction meta-material, and
    applying, by avionics circuitry of the aircraft, an electric field to a substrate of the antenna to control a dielectric constant of the negative index of refraction meta-material of the antenna,
    wherein the electrical frequency comprises an avionics frequency.

17. The method of claim 16, further comprising:
    communicating data from the aircraft directly to a target aircraft, satellite, or ground station over the antenna at the electrical frequency.

18. An apparatus, comprising:
    means for scanning an environment of an aircraft in which the means for scanning is installed; and
    antenna means comprising a negative index of refraction meta-material,
    wherein the means for scanning comprises means for applying an electric field to control a dielectric constant of the negative index of refraction meta-material of the antenna, and
    wherein the means for scanning is configured to scan the environment of the aircraft using the antenna means.

19. The apparatus of claim 18, further comprising:
    a plurality of means for receiving reflected radio frequency, wherein each of the plurality of means for receiving is tuned to a respective one of the plurality of frequencies.

20. The apparatus of claim 18, wherein the apparatus comprises the aircraft.

21. The apparatus of 18, further comprising:
    a plurality of meta-material antennas configured to create a summed signal in space.

22. The method of claim 1, wherein the scanning comprises scanning across at least one of a vertical arc or a horizontal arc to obtain a full field of view scan of the environment of the aircraft.

* * * * *